United States Patent
Wang et al.

(10) Patent No.: US 9,214,861 B2
(45) Date of Patent: Dec. 15, 2015

(54) LOSS OPTIMIZATION CONTROL FOR DC-TO-DC CONVERTER

(71) Applicants: Chi-Ming Wang, Canton, MI (US); Masaki Wasekura, Aichi-gun (JP); Robert D. Lorenz, Madison, WI (US)

(72) Inventors: Chi-Ming Wang, Canton, MI (US); Masaki Wasekura, Aichi-gun (JP); Robert D. Lorenz, Madison, WI (US)

(73) Assignees: TOYOTA JIDOSHA KABUSHIKI KAISHA, Toyota-Shi (JP); WISCONSIN ALUMNI RESEARCH FOUNDATION, Madison, WI (US)

( * ) Notice: Subject to any disclaimer, the term of this patent is extended or adjusted under 35 U.S.C. 154(b) by 188 days.

(21) Appl. No.: 13/930,037

(22) Filed: Jun. 28, 2013

(65) Prior Publication Data

US 2015/0002121 A1 Jan. 1, 2015

(51) Int. Cl.
*H02M 7/5387* (2007.01)
*H02M 3/156* (2006.01)
*H02M 1/00* (2007.01)

(52) U.S. Cl.
CPC ...... *H02M 3/156* (2013.01); *H02M 2001/0025* (2013.01)

(58) Field of Classification Search
CPC .............. H02M 3/33515; H03M 3/506; H01L 27/0266; H03K 17/0822
USPC .......................... 323/207, 222, 268, 282–288; 363/34–39, 132; 318/139, 799, 430
See application file for complete search history.

(56) References Cited

U.S. PATENT DOCUMENTS

| | | | | |
|---|---|---|---|---|
| 6,225,795 B1* | 5/2001 | Stratakos et al. | ............... | 323/283 |
| 6,400,585 B2* | 6/2002 | Jiang-Hafner | ................... | 363/35 |
| 6,933,711 B2* | 8/2005 | Sutardja et al. | ................ | 323/283 |
| 7,102,903 B2* | 9/2006 | Nakamura et al. | ............... | 363/98 |
| 7,109,605 B2* | 9/2006 | Habu | ............................. | 307/39 |
| 7,456,620 B2* | 11/2008 | Maksimovic et al. | ......... | 323/283 |
| 7,906,949 B1* | 3/2011 | Sutardja et al. | ................ | 323/282 |
| 8,129,936 B2* | 3/2012 | Becker et al. | .................. | 318/802 |
| 2014/0006808 A1* | 1/2014 | Sizikov et al. | ................. | 713/300 |

OTHER PUBLICATIONS

Bibian, S., "High Performance Predictive Dead-Beat Digital Controller for DC Power Supplies," IEEE Transactions on Power Electronics, 17(3), May 2002, pp. 420-427.

(Continued)

*Primary Examiner* — Rajnikant Patel
(74) *Attorney, Agent, or Firm* — Kenyon & Kenyon LLP

(57) ABSTRACT

A DC-to-DC, converter that can reduce a loss of the converter is provided. The DC-to-DC converter includes an inductor, a switching transistor connected to the inductor, and a controller that drives the transistor. The controller acquires a next step reference value for the DC-to-DC converter in a sampling time Ta. The next step reference value is expressed by an output voltage of the DC-to-DC converter or a flux linkage of the inductor. The controller determines interpolating points between a current state value that corresponds to the current reference value and the next step reference value in a sampling time Ts that is shorter than the sampling time Ta based on a loss of the DC-to-DC converter while changing from the current state value to the next step reference value. The controller supplies to the switching transistor the PWM signals with a duty that corresponds to each of the interpolating points.

7 Claims, 6 Drawing Sheets

(56) References Cited

OTHER PUBLICATIONS

Ericson, R.W., "Chapter 9: Controller Design," Fundamentals of Power Electronics, Springer, 2nd Edition, Jan. 2001.

Muta, K. et al., "Development of New-Generation Hybrid System THS II—Drastic Improvement of Power Performance and Fuel Economy," SAE Technical Paper Series 2004-01-0064, 2004 SAE World Congress, Detroit, Michigan, Mar. 8-11, 2004.

* cited by examiner

LOSS OPTIMIZATION CONTROL FOR DC-TO-DC CONVERTER

TECHNICAL FIELD

The present invention relates to loss optimization control for a DC-to-DC converter.

DESCRIPTION OF RELATED ART

A DC-to-DC converter to raise or lower voltage is used in a variety of devices. For example, the DC-to-DC converter is often used in a power system of an electric vehicle or a hybrid vehicle. Because efficiency is particularly important in electric vehicles and hybrid vehicles, efficiency of the DC-to-DC converter is also important. For example, Prior Document 1 ("Development of New-Generation Hybrid System II—Drastic Improvement of Power Performance and Fuel Economy", Koichi Muta et al, SAE TECHNICAL PAPER SERIES 2004-01-0064, 2004, SAE World Congress Detroit, Mich., Mar. 8-11, 2004) discloses a technique for improving the total efficiency of the power system of a hybrid vehicle. The power system includes the DC-to-DC converter, a motor, and an inverter, etc.

On the other hand, applying a dead-beat control law to control the DC-to-DC converter has been studied. For example, one of such studies is disclosed in Prior Document 2 ("High Performance Predictive Dead-Beat Digital Controller for DC Power Supply", Stephane Bibian, et al, IEEE Transaction on Power Electrics, Vol. 17, No. 3, May, 2002). Moreover, for detail concerning digital control of the DC-to-DC converter, please refer to Prior Document 3 ("Fundamentals of Power Electronics", Robert W. Ericson, Springer, 2nd edition, January 2001). It should be noted that the "DC-to-DC converter" will simply be called a "DC converter" herein after for the sake of simplicity.

SUMMARY OF INVENTION

The teachings disclosed herein provide a technique for suppressing a loss of a DC converter, i.e. loss optimization control for a DC converter. The point thereof is that, in the case where a control period of the DC converter can be shortened with respect to a time constant of the entire control system in which the DC converter is incorporated, the DC converter has flexibility to determine a local output trajectory under a restriction of trajectory of a reference value for the DC converter with a long period required by the entire system. Here, the "reference value" means a target output for the DC converter and the local output trajectory is a trajectory between two adjacent reference values. One aspect of the present teachings is that, based on a loss of the DC converter, the DC converter determines a Short period (local) output trajectory which can be determined independently of the requirements of the entire control system. By determining the output trajectory of a short period based on the loss of the DC converter, the DC converter taught herein suppresses the loss of the DC converter while realizing the output trajectory of a long period as required by the control system.

A motor control system of, for example, an electric vehicle (or hybrid vehicle) is assumed. A DC converter is also incorporated into the motor control system. The output of a motor of the electric vehicle is several tens of kilowatts, and consequently a mechanical time constant thereof is of the order of approximately 1.0 [sec]. Generally, control sampling time of a control system is preferably selected to be 1/10 of the time constant of a control target plant or less. That is, when the mechanical time constant of the motor is of the order of approximately 1.0 [sec], the control sampling time Ta of the motor control system of the electric vehicle may be of the order of 100 [msec]. In the case where the control sampling time Ta of the entire control system may be 100 [msec], time series data of the output of the DC converter comes to be of a 100 [msec] cycle. Here, the time series data of the output corresponds to the trajectory of the output, in other words.

The entire system requires the DC converter to output in response to the reference values supplied every time period of Ta=100 [msec]. The system does not require the trajectory in a 100 [msec] span between two adjacent reference values. That is, the entire motor control system is not affected by whichever trajectory is adopted between the two adjacent reference values. On the other hand, with the development of recent CPUs, a controller can perform digital control of the order of 1-10 [msec]. Therefore, if a controller of a DC converter uses, e.g. a CPU capable of performing digital control every 10 [msec] period, the controller may interpolate ten interpolating points between the two adjacent reference values having a 100 [msec] span, and can flexibly determine the trajectory thereof. The DC converter taught in the present specification, determines the interpolating points between the 100 [msec] interval of two adjacent reference values so as to reduce the loss of the DC converter.

Many DC converters comprise an inductor and a switching transistor connected to the inductor. A controller of the DC converter drives the switching transistor with PWM signals. A control sampling time of the DC converter, which is required by an entire control system of the motor, will be called "Ta". Further, a reference value for the DC converter is represented by the symbol: Ref (t) ("t" denotes time). The controller acquires a next step reference value Ref (t+Ta) for the DC converter in which "Ta" is the sampling time required by the entire control system. Usually, an upper controller, which is superior to the controller of the DC converter, determines the next step reference value Ref (t+Ta). In the case of the electric vehicle, the upper controller determines, based on a throttle divergence and vehicle speed, the target output of the motor and the target output of the DC converter. The upper controller determines the reference value corresponding to the target output of the DC converter.

The controller of the DC converter can perform control in every sampling time Ts that is shorter than Ta. Accordingly, based on the loss of the DC converter while changing from a current state variable value to the next step reference value Ref (t+Ta), the controller of the DC converter determines interpolating points Ref (t+Ts), Ref (t+2·Ts), Ref (t+3·Ts), . . . Ref (t+n·Ts)=Ref (t+Ta) between the current state variable value and the next step reference value Ref (t+Ta). Here, the "current state variable value" corresponds to the current reference value Ref (t). In one typical case, the current state variable is the current output of the DC converter which is realized by the current reference value R (t). As described above, Ref (t) and Ref (t+Ta) are determined from the requirements of the motor control system, whereas the DC converter can independently determine the interpolating points between Ref (t) and Ref (t+Ta). Consequently, the interpolating points (i.e., the trajectory) between Ref (t) and Ref (t+Ta) can be determined so as to reduce the loss of the DC converter. Once the interpolating points are determined, the controller of the DC converter determines a duty for realizing each of the interpolating points, and supplies the switching transistor with a PWM signals having the determined duty.

In the above algorithm, the reference value Ref (t+Ta) of the next step t+Ta is supplied to the controller of the DC converter at current time t. A result corresponding to the current reference value Ref (t) is realized at the current time. Generally, the state of the plant (the DC converter) is expressed by a plurality of state variables and one of which corresponds to the reference value. That is, a current state variable value corresponding to the current reference value Ref (t) can be acquired. Consequently, instead of finding the interpolating points between Ref (t) and Ref (t+Ta), it is better to find the interpolating points between the current state variable value that corresponds to the current reference value Ref (t), and the next step reference value Ref (t+Ta).

Further, in the above control algorithm, the next step reference value Ref (t+Ta) may be expressed by output voltage of the DC converter or a flux linkage of the inductor.

The flux linkage means a property of a two-terminal element. In this description, the flux linkage is represented by the symbol $\lambda$. The flux linkage $\lambda$ is defined by the equation (eq 1):

$$\lambda = \int v dt \quad (eq\ 1)$$

where "v" is the voltage across the inductor or the potential difference between the two terminals of the inductor. This definition can also be written in differential form as the equation (eq 2):

$$v = \frac{d\lambda}{dt} \quad (eq\ 2)$$

The loss of the Dc converter, including loss of the inductor, can be found in advance by experiment. Alternatively, if a mathematical model of the DC converter can be acquired, the loss of the DC converter can also be calculated in real time using an evaluation formula. Consequently, the loss of the DC converter may be stored in advance in the controller as a look up table, or the loss of the DC converter may be determined by a performance function indicating the loss while changing from the current state variable value to the next step reference value Ref (t+Ta). In the latter case, the interpolating points are determined so as to minimize the value of the performance function when the current state variable value and the next step reference value Ref (t+Ta) are given.

Details of the technique disclosed herein and further improvements thereto are described in the following embodiment.

DETAILED DESCRIPTION OF INVENTION

Figure 1:
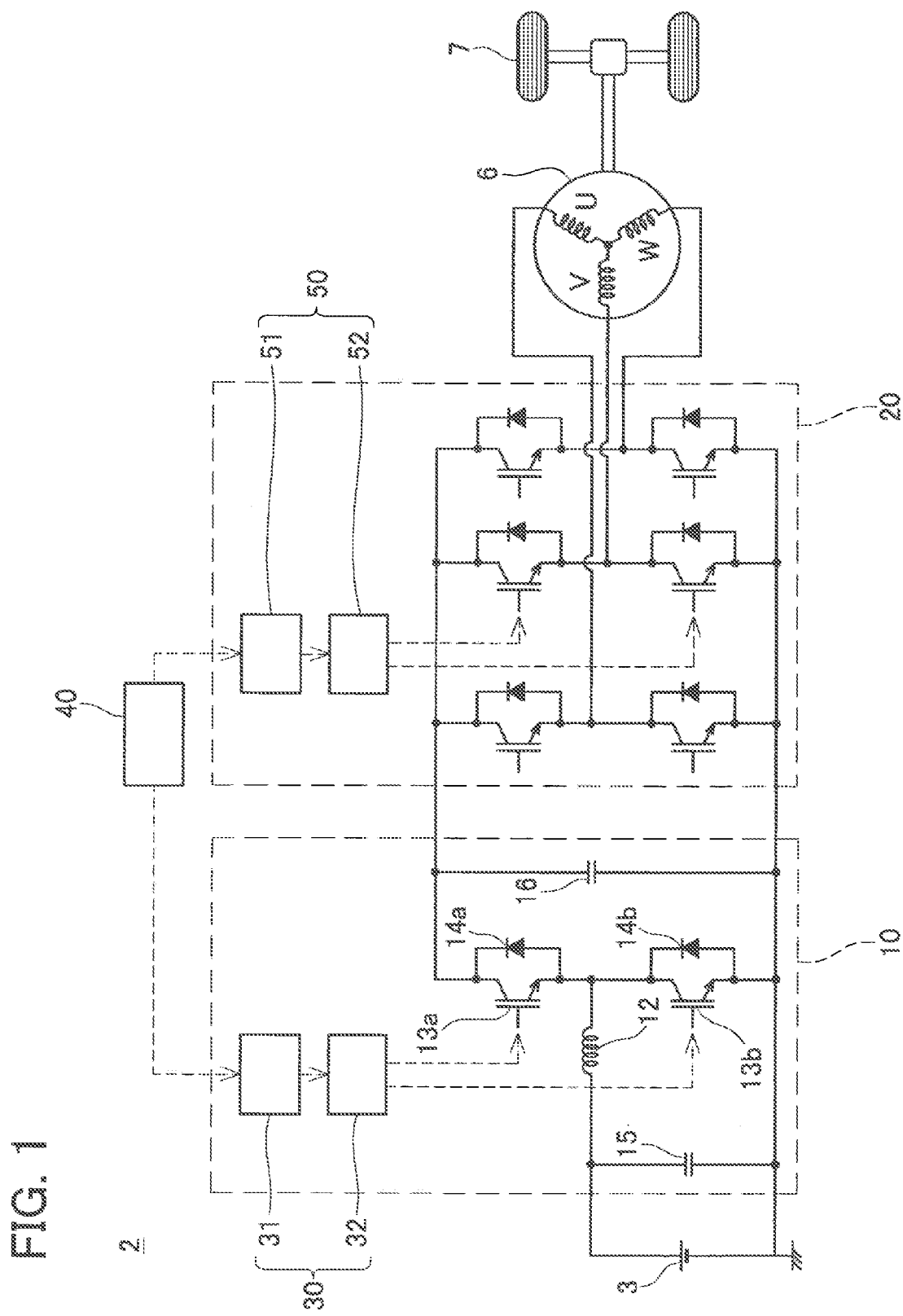
FIG. 1 shows a block diagram of a power system of an electric vehicle, this power system including a DC converter of an embodiment.

A DC converter (a DC-to-DC converter) of an embodiment will be described with reference to the drawings. The DC converter of the embodiment is incorporated into a power system 2 of an electric vehicle. First, the power system 2 of the electric vehicle will be described with reference to FIG. 1.

The power system 2 includes, as its primary configuration, a battery 3, a DC converter 10, an inverter 20, and a motor 6. The DC converter 10 and the inverter 20 are connected in series between the battery 3 and the motor 6. The DC converter 10 steps up the output voltage of the battery 3. For example, the output voltage of the battery is 300 volts, and the DC converter 10 steps up the 300 volt input voltage to 600 volts. The inverter 20 converts the DC power output by the DC converter 10 into AC power suitable for driving the motor 6. The motor 6 outputs torque by using the electric power supplied by the inverter 20. The output torque of the motor 6 is transmitted to driving wheels 7 via an axle.

The DC converter 10 is composed of two transistors 13a, 13b, two diodes 14a, 14b, two capacitors 15, 16, an inductor 12, and a converter controller 30. The transistors 13a, 13b correspond to switching transistors. The respective transistors 13a, 13b and the respective diodes 14a, 14b are connected in antiparallel. Further, the converter controller 30 is composed of a duty generator 31 and a gate driver 32. The capacitor 15 smoothes the input current of the DC converter 10. The capacitor 16 smoothes the output current of the DC converter 10.

The DC converter 10 outputs a suitable voltage by appropriately controlling the two transistors 13a, 13b. The duty generator 31 receives a command from an upper controller 40, and generates a duty "d" for PWM signals for controlling the two transistors 13a, 13b. Next, the gate driver 32 generates the PWM signals with the duty "d", and supplies the generated PWM signals to the transistors. Since the circuit of the converter shown in FIG. 1 is well known, a detailed explanation thereof is omitted. Moreover, the circuit shown in FIG. 1 is capable of both step up and step down.

The inverter 20 converts the DC power output by the DC converter 10 into AC power suitable for driving the motor 6. The inverter 20 is constituted by six transistors and six diodes. Since the circuit configuration of the inverter 20 of FIG. 1 is also well known, a detailed explanation thereof is omitted. Based on a command from the upper controller 40, a duty generator 51 generates a duty for PWM signals for driving the transistors. Next, a gate driver 52 generates the PWM signals with the duty, and supplies the PWM signals to the transistors. Moreover, in FIG. 1, only signal lines extending from the gate driver 52 to two transistors are depicted, it should be noted that signal lines to other transistors are not shown.

The upper controller 40 determines the output (target output) of the motor 6 in response to the position of the accelerator pedal and vehicle speed. The controller 40 determines a reference value for the inverter 20 and a reference value for the DC converter 10 in accordance with the target output of the motor 6. In the case of the present embodiment, the reference value for the inverter 20 is a target frequency [Hz] and a target output current [Ampere]. The reference value for the DC converter 10 is target output voltage [Volt]. The reference values determined by the upper controller 40 are supplied to the converter controller 30 and an inverter controller 50 respectively.

The upper controller 40 repeatedly determines the reference values for the inverter 20 and the DC converter 10, with sampling time Ta. This sampling time has been determined depending on a mechanical time constant of the motor 6. This is because a response of the motor 6 may not be improved even if a controller controls the motor 6 with a higher frequency compared to the mechanical time constant of the motor 6. The motor 6 has a large output so as to move a vehicle. The output of the motor 6 is, for example, several tens of kilowatts. The time constant of the motor 6 with this type of large scale is generally of the order of approximately 1.0 [sec]. It is generally known that the control sampling time Ta may be sufficient to be approximately 1/10 the mechanical time constant of the plant. Consequently, the control sampling time Ta of the upper controller 40 may be sufficient to be approximately 100 [msec].

Figure 2:
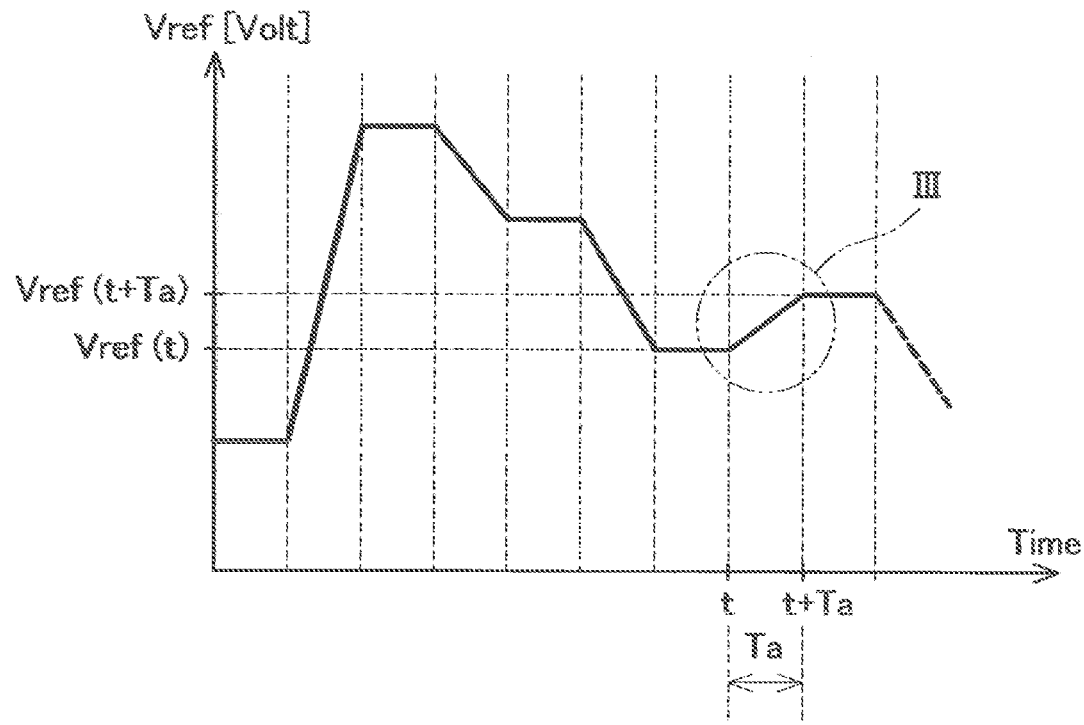
FIG. 2 is a graph showing an example of a time series pattern of target output voltage of the DC converter.

Next, the operation of the DC converter 10 will be described. As described above, the upper controller 40 updates the reference value of the DC converter 10 in every sampling time Ta of order of 100 [msec]. In the ease of the present embodiment, the reference value output by the upper controller 40 is expressed by the output voltage of the DC converter 10, and its unit system is voltage (volts). That is, the reference value acquired by the DC converter 10 is the target of the output voltage of the DC converter. Herein after, the target output voltage as the reference value will be denoted by the symbol "Vref". Since the target output voltage Vref is a function of time "t", this is denoted as Vref (t). Further, since the sampling time of the upper controller 40 is Ta, the target output voltage Vref (t) (the reference value) is updated with the period Ta. Consequently, the target output voltages can be expressed by Vref (t+k·Ta) (k=1, 2, 3, . . . ). FIG. 2 shows one example of a time series pattern of the target output voltage Vref (t) (reference value). As shown in FIG. 2, the target output voltage at time "t" (the current reference value) is expressed by Vref (t), and the target output voltage at time "t+Ta" (the next step reference values) is expressed by Vref (t+Ta). The time series pattern Vref (t) of the target output voltage shown in FIG. 2 is determined by the upper controller 40, and is supplied to the DC converter 10. The graph in FIG. 2 shows a time series pattern of the target output voltage of the DC converter that is required by the power system 2. In other words, the time series pattern may be called an output trajectory.

The time series pattern Vref (t+k·Ta) (k=1, 2, 3, . . . ) of the target output voltages is determined by the upper controller 40, and the DC converter 10 cannot change the time series pattern Vref (t+k·Ta) (k=1, 2, 3, . . . ). However, the time series pattern Vref (t+k·Ta) supplied by the upper controller 40 is a sequence of points with the period Ta, and the upper controller 40 is not concerned with the local trajectory from Vref (t) to Vref (t+Ta). That is, the DC converter 10 has flexibility in selecting the local trajectory between Vref (t) and Vref (t+Ta). Consequently, the DC converter 10 of the present embodiment determines the local trajectory from Vref (t) to Vref (t+Ta) so as to reduce the loss of the DC converter.

In contrast to the overall trajectory which is specified by the upper controller 40 as the time series data Vref (k·Ta) (k=1, 2, 3, . . . ), the trajectory that can be flexibly determined by the DC converter 10 has a short period between Vref (t) and Vref (t+Ta). Below, the trajectory from Vref (t) to Vref (t+Ta) may be called the "local trajectory".

Figure 3:
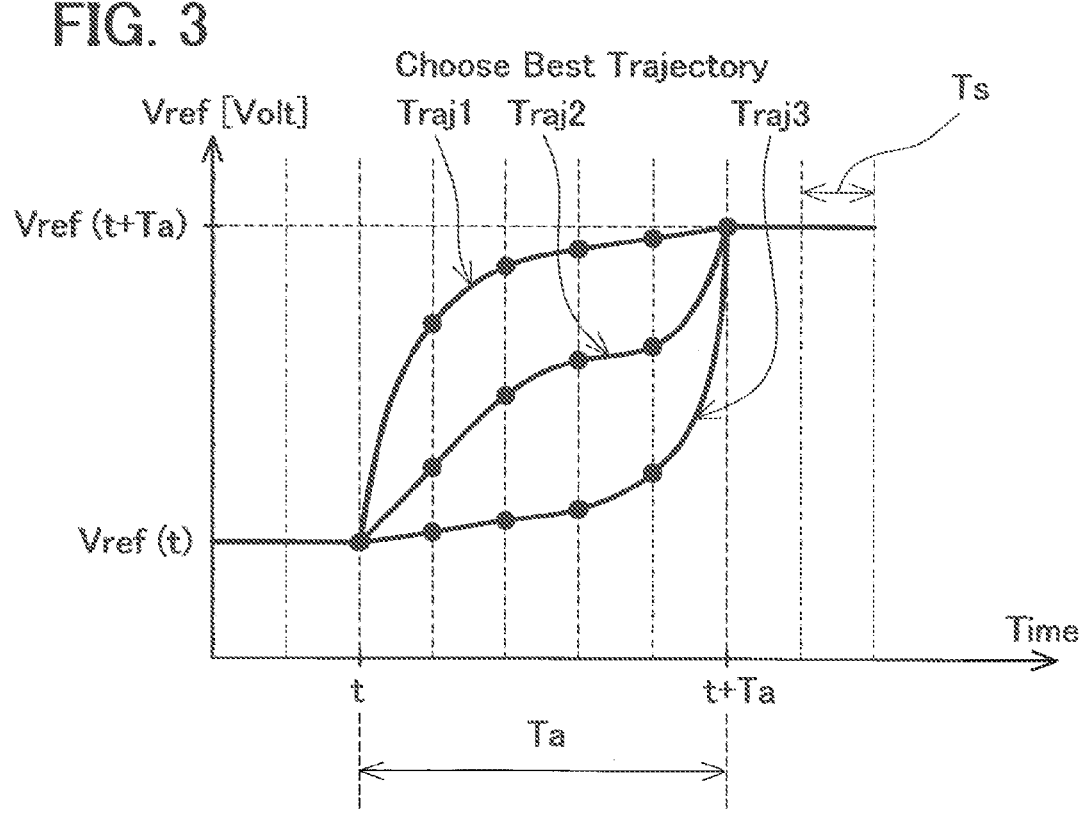
FIG. 3 shows an example of a plurality of local trajectories between Vref (t) and Vref (t+Ta).

FIG. 3 shows an example of a plurality of local trajectories from Vref (t) to Vref (t+Ta). FIG. 3 is an enlarged view of a range indicated by the symbol III in FIG. 2. The converter controller 30 drives the transistors 13a, 13b with a sampling time Ts that is shorter than the updated sampling time Ta of the target output voltage Vref supplied from the upper controller 40. In other words, in the period of the time interval Ta from Vref (t) to Vref (t+Ta), the converter controller 30 determines the target output voltage a number of times expressed by Ta/Ts, and drives the transistors 13a, 13b so as to follow the time series data (local trajectory) of that target output voltage. Various local trajectories from Vref (t) to Vref (t+Ta) may be produced by the method for determining the time series data of Ta/Ts items of target output voltage. Three different local trajectories Traj1, Traj2, and Traj3 are illustrated in FIG. 3. As shown in FIG. 3, the "local trajectory" is the time series data of the Ta/Ts items of target output voltage Vref (t+Ts), Vref (t+2·Ts), Vref (t+3·Ts), . . . , Vref (t+n·Ts) from Vref (t) to Vref (t+Ta). Here, n=Ta/Ts. The time series data of the Ta/Ts items of target output voltage Vref (t+Ts), Vref (t+2·Ts), Vref (t+3·Ts), . . . , Vref (t+n·Ts) from Vref (t) to Vref (t+Ta) are interpolating points from Vref (t) to Vref (t+Ta).

Figures 4, 5:
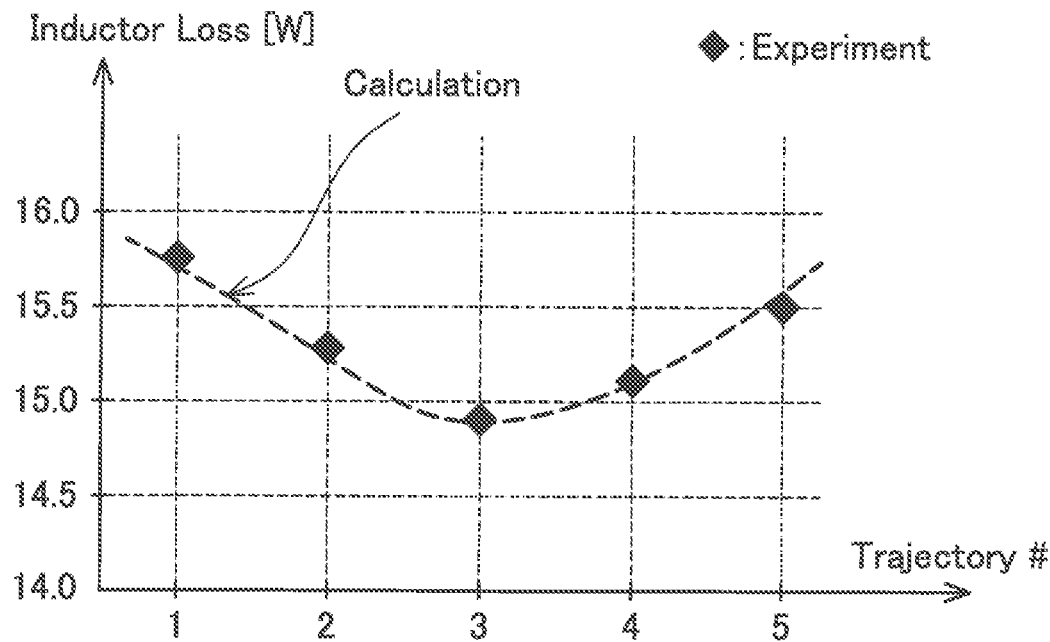
FIG. 4 is a graph showing a comparison of converter loss for each of the plurality of local trajectories.
FIG. 5 schematically shows an example of a look up table.

The loss of the converter depends on its output. The output from Vref (t) to Vref (t+Ta) depends on the local trajectory therebetween. Therefore, the converter controller 30 selects, from among a plurality of different local trajectories, the local trajectory in which the loss of the converter is minimized while the target output voltage moves from Vref (t) (the current reference value) to Vref (t+Ta) (next step reference value). The loss of the converter is determined by physical configurations of the converter, a starting target output voltage (i.e., Vref (t)), and a destination target output voltage (i.e., Vref (t+Ta)). Therefore, the loss of the converter can be estimated in advance. For example, FIG. 4 shows a graph summarizing the amount of the loss of the inductor for each local trajectory. Traj1-Traj5 are symbols for identifying the local trajectories. Each of the local trajectories is predetermined. Traj1-Traj3 of FIG. 2 is an example thereof.

In the graph of FIG. 4, the loss of the inductor 12 was considered as the loss of the entire converter. The broken line graph represents the loss of the local trajectories found by simulation, and the square points are based on the loss of the inductor determined by experiment. In the example of FIG. 4, loss is smallest for Traj3.

The loss of each local trajectory may be determined in advance by experiment, summarized in a look up table and stored in the converter controller 30, or may be calculated in real time using a performance function of loss in which Vref (t) and Vref (t+Ta) are input parameters. In the present embodiment, the converter controller 30 stores various local trajectories, which minimize loss with respect to Vref (t) and Vref (t+Ta), in the format of a look up table. An example thereof is shown in FIG. 5. Symbols Traj01 to Traj44 each represent a particular local trajectory. As described earlier, each local trajectory includes time series data (interpolating points) of Ta/Ts items of target output voltage Vref (t+Ts), Vref (t+2·Ta), Vref (t+3·Ts), . . . , Vref (t+n·Ts) between Vref (t) and Vref (t+Ta). Each of the plurality of local trajectories Traj01 to Traj44 individually represents particular time series data, and the converter controller 30 stores the entire sequence of points. Below, n=Ta/Ts. That is, "n" is the number of repetitions of control performed by the converter controller 30 during the sampling time Ta of the upper controller 40.

The local trajectory is time series data between the two adjacent points of the target output voltages Vref (t) and Vref (t+Ta) supplied by the upper controller 40. In other words, the local trajectory is interpolating points between the two adjacent points Vref (t) and Vref (t+Ta).

When the next step target output voltage Vref (t+Ta) is given from the upper controller 40, the converter controller 30 selects, from the look up table, the optimal local trajectory that corresponds to the next step target output voltage Vref (t+Ta) and the current target output voltage Vref (t). Moreover, at time "t", the actual output voltage Vout (t) which corresponds to the current target output voltage Vref (t) can be obtained. In other words, a current state variable Vout (t) corresponding to the current target output voltage Vref (t) has been determined. Therefore, Vout (t) may be used for referring to the look up table, instead of Vref (t).

Between time "t" to "t+Ta", the converter controller 30 drives the transistors 13a, 13b with the period Ts, with each point of the selected local trajectory as the target output voltage. That is, at each time k·Ts (k=1, 2, 3, ..., n), the converter controller 30 drives the transistors 13a, 13b such that the output of the DC converter follows the target output voltages Vref (t+k·Ts) (k=1, 2, 3, ..., n).

In the above description, receiving the next step target output voltage Vref (t+k·Ta) from the upper controller 40 and determining the duty "d" for realizing Vref (t+k·Ta) is executed by the duty generator 31, and the gate driver 32 generates PWM signals with the determined duty "d", and supplies the PWM signals to the respective transistors. It is noted that the converter controller 30 repeats the interpolation and subsequent processes in every period Ta.

Figure 6:
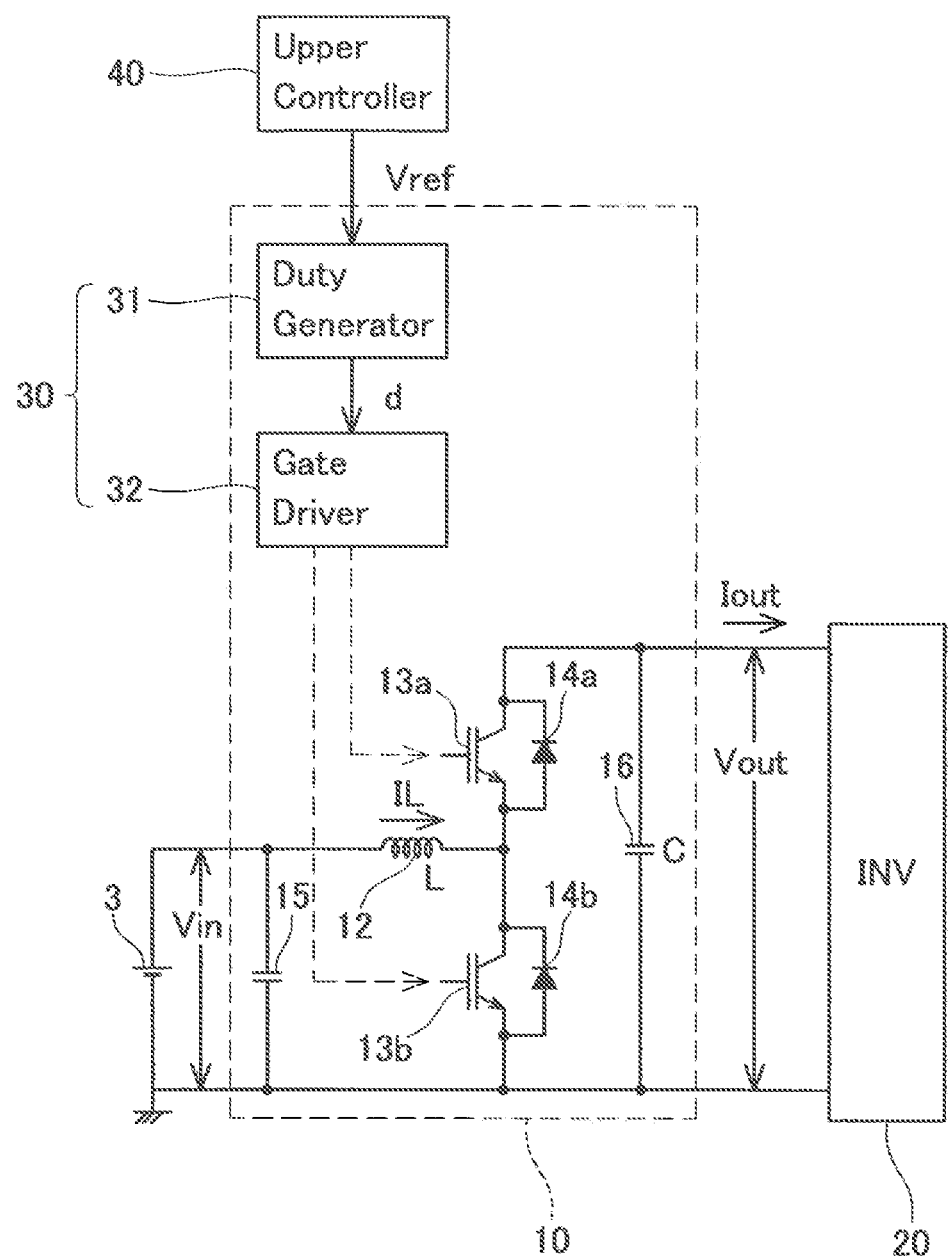
FIG. 6 shows a circuit diagram of the DC converter.

Next, the control process of the converter controller 30 repeated every sampling time Ts will be described in detail. FIG. 6 again shows a circuit diagram of the DC converter 10. The circuit diagram of FIG. 6 is the same as the circuit diagram of the DC converter 10 in FIG. 1. Symbols indicating the physical variable of each element of the DC converter 10 are added to FIG. 6. The symbol Via represents input voltage of the DC converter 10. Vin also represents output voltage of the battery 3. The symbol IL represents a current flowing in the inductor 12. Below, the current flowing in the inductor 12 is called an inductor current IL. The symbol L represents the inductance of the inductor 12. The symbol C represents the capacitance of the capacitor 16. The symbol Iout represents the current output of the DC converter 10. Vout represents the output voltage of the DC converter 10. The input voltage Vin, output current Iout, output voltage Vout, and inductor current IL are measured by sensors (not shown).

In a DC converter having the configuration of FIG. 6 (FIG. 1), as is well known, when the duty of the PWM signals supplied to the upper arm transistor 13a is expressed by "d", the PWM signals with duty "1-d" are supplied to the lower arm transistor 13b. When the voltage is stepped up by a circuit having the configuration of FIG. 6, the upper arm transistor 13a mainly contributes to increasing the voltage. While stepping up the voltage, the DC controller 30 supplies the PWM signals to the lower arm transistor 13b for passing a reverse current. The duty of the PWM signals supplied to the lower arm transistor 31b for passing a reverse current is expressed by "1-d".

While the PWM signals with the duty "d" and "1-d" are supplied to the upper arm transistor 13a and lower arm transistor 13b respectively, the relationship between current and voltage within the DC converter is, according to the state averaging method, expressed by the following equation (3).

$$L\frac{d\langle IL(t)\rangle Ts}{dt} = \langle Vin(t)\rangle Ts - d(t) \cdot \langle Vout(t)\rangle Ts \quad \text{(eq 3)}$$

$$C\frac{d\langle Vout(t)\rangle Ts}{dt} = d(t) \cdot \langle IL(t)\rangle Ts - \langle Iout(t)\rangle Ts$$

Equation (3) represents the relationship at time "t". The symbol "d (t)" represents the duty for the PWM signals supplied to the transistor 13a. The symbol "d/dt" represents a time differential. Further, the symbol $\langle A \rangle_{Ts}$ means the average value of a variable A in time period Ts. The sampling time Ts is the control period of the converter controller 30. An inverse transformation is performed for equation (3), and discretizing with sampling time Ts, the following equation (4) is obtained.

$$ILref[k+1] = \frac{1}{1-d[k]}\left\{\frac{C(Vref[k+1]-Vout[k])}{Ts} + Iout[k]\right\} \quad \text{(eq 4)}$$

$$d[k+1] = \frac{1}{Vout[k]}\left\{\frac{L(ILref[k+1]-IL[k])}{Ts} - Vin[k] + Vout[k]\right\}$$

Equation (4) gives the control scheme from time "t" to time "t+Ta" when the next step target output voltage Vref (t+Ta) is supplied from the upper controller 40 at the current time "t". Therefore, k=1, 2, 3, ..., n, in Equation (4) (on the condition that n=Ta/Ts).

Equation (4) gives the duty "d (t+(k+1)·Ts)" for the PWM signals to be output by the converter controller 30 at time "t+k·Ts (k=1, 2, 3, ..., n)". Here, in equation (4), time is expressed only by the natural number k, and duty at the current time k is expressed by d [k]. In other words, equation (4) gives the duty d [k+1] at time k for realizing the target output voltage Vref [k+1]. Moreover, as described above, in the present embodiment, the reference value of the DC converter 10 is expressed by the output voltage Vref, but in equation (4), the output reference value Vref [k+1] at time k+1 is replaced by the reference value ILref [k+1] of the inductor current IL. Further, since the output voltage Vout and the output current Iout can be measured at time k, in equation (4), the measured output voltage Vout [k] and the measured output current Iout [k] are adopted instead of Vref [k], Iref [k]. Further, IL [k] appearing in equation (4) represents the inductor current at time k. The inductor current IL [k] can also be measured at time k. In other words, the measured value Vout [k], etc. are adopted as the various values at the current time k instead of the reference value Vref [k].

Figure 7:
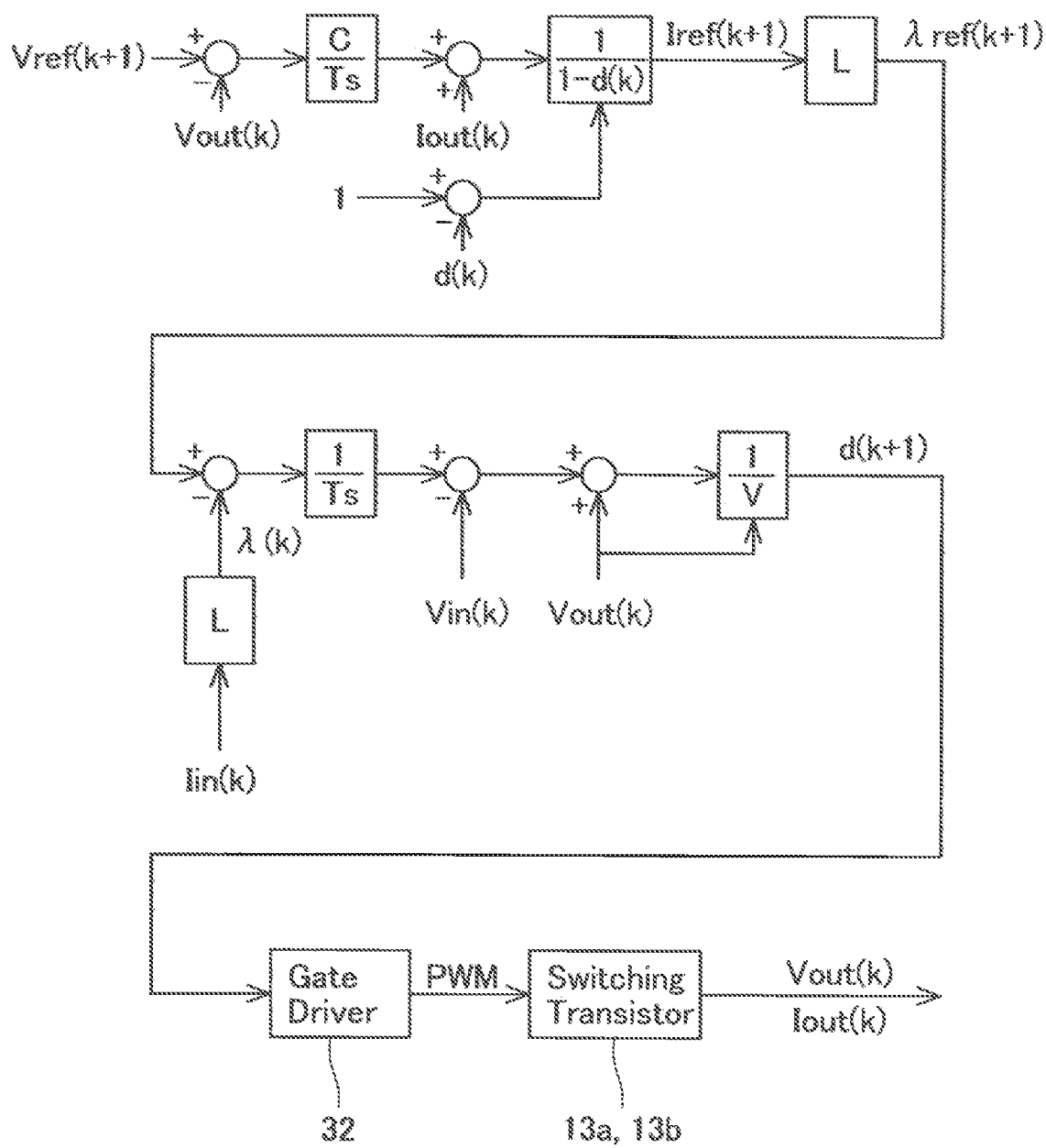
FIG. 7 shows a control block diagram of the DC converter.

FIG. 7 shows a block diagram being equivalent to equation (4). λref [k+1] appears in the block diagram of FIG. 7. The symbol λ represents flux linkage where λ=IL·L. The symbol IL represents inductor current, and L represents the inductance of the inductor. Moreover, when expressed in a continuous time system, the relationship of the equations (eq 1) and (eq 2) described earlier is established between the flux linkage λ and the voltage "v" at both ends of the inductor.

Figure 8:
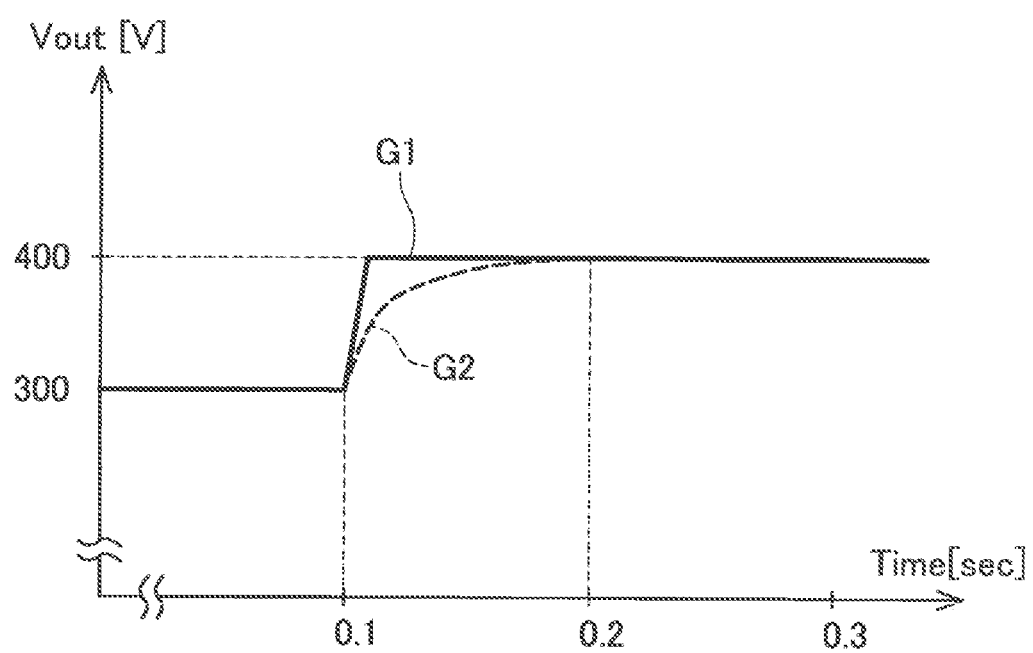
FIG. 8 is a schematic graph comparing the performance of dead-beat control and PID control.

The control block diagram of FIG. 7 and (eq 4) represent the dead-heat control in which output in one step can match the reference value. FIG. 8 is a graph schematically showing the difference on performance by the dead-beat control and conventional PID control. The graph of FIG. 8 is a response waveform when a reference value that changes from 300 volts to 400 volts in stepwise is given at time=0.1[sec]. Since the control sampling time Ta of the upper controller 40 is 100 [msec] (=0.1 [sec]), it is sufficient, according to the requirements of the upper controller, to reach the reference value of 400 volts after 0.1 seconds.

Graph G1 shows the results obtained by the dead-beat control, and graph G2 shows the results obtained by the PID control. In the results of the PID control (graph G2), the response approaches the reference value (400 volts) asymptotically whereas, in the dead-beat control (graph G1), the response changes in a stepwise, and the response matches the reference value in only one step (Ts=0.01 sec).

Some notes relating to the techniques described in the embodiment will be described. For the reference values of sampling time Ta determined by the upper controller, the DC converter described in the embodiment can be controlled with the sampling time Ts, this being shorter than sampling time Ta. The controller 30 of the DC converter determines the local trajectory from the reference values Vref (t) to Vref (t+Ta) acquired from the upper controller such that the loss of the DC converter is reduced. The DC converter 10 can reduce the loss while following the trajectory of the entire reference values determined by the upper controller.

In the DC converter of the embodiment, the next step reference value Ref (t) provided by the upper controller was expressed by target output voltage. The reference value Ref (t) acquired by the converter controller may be the flux linkage λ.

In the DC converter of the embodiment, the local trajectory was determined based on the loss of the DC converter while changing from the current state value corresponding to the current reference value Ref (t) to the next step reference value Ref (t+Ta). Instead, the DC converter taught in the present specification may determine the local trajectory based on the loss of the DC converter while changing from the current reference value Ref (t) to the next step reference value Ref (t+Ta). The "current state value corresponding to the current reference value Ref (t)" and the "current reference value Ref (t)" are essentially equivalent.

In the DC converter of the embodiment, the local trajectory (i.e., interpolating points) of two points from Vref (t) to Vref (t+Ta) given from the upper controller 40 was obtained from the look up table. The local trajectory (i.e., interpolating points) may be obtained using a performance function in which the two points Vref (t) and Vref (t+Ta) will be used as input variables, and the loss of the DC converter between those two points is a dependent variable. One example of the performance function is given in the form of equation (5) below.

$$\text{Index} = f(Vref[t], Vref[t+Ta], Vref[t+k \cdot Ts]), \quad k=1, 2, \ldots, n \quad (\text{eq 5})$$

The controller 30 of the DC converter determines Vref (t+k·Ts), (k=1, 2, . . . , Ta/Ts) such that the Index of equation (eq 5) is minimized.

Representative, non-limiting examples of the present invention have now been described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved DC converter, as well as methods for controlling the DC converter.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A DC-to-DC converter comprising:
an inductor;
a switching transistor connected to the inductor; and
a controller programmed to:
    drive the switching transistor with PWM signals;
    acquire a next step reference value Ref (t+Ta) for the DC-to-DC converter in a sampling time Ta, the next step reference value Ref (t+Ta) being expressed by an output voltage of the DC-to-DC converter or a flux linkage of the inductor;
    determine interpolating points Ref (t+Ts), Ref (t+2·Ts), Ref (t+3·Ts), . . . Ref (t+n·Ts)=Ref (t+Ta), between a current state value that corresponds to a current reference value Ref (t) and the next step reference value Ref (t+Ta) in a sampling time Ts that is shorter than the sampling time Ta based on a loss of the DC-to-DC converter while changing from the current state value to the next step reference value Ref (t+Ta);
    determine a duty that corresponds to each of the interpolating points Ref (t+k·Ts) in the sampling time Ts; and
    supply to the switching transistor the PWM signals with the duty that corresponds to each of the interpolating points Ref (t+k·Ts) in the sampling time Ts.

2. The DC-to-DC converter of claim 1, wherein the controller is programmed to determine the interpolating points Ref (t+Ts), Ref (t+2·Ts), Ref (t+3·Ts), . . . Ref (t+n·Ts)=Ref (t+Ta) so as to minimize the loss of the DC-to-DC converter.

3. The DC-to-DC converter of claim 1, wherein the controller is programmed to determine the interpolating points Ref (t+Ts), Ref (t+2·Ts), Ref (t+3·Ts), . . . Ref (t+n·Ts)=Ref (t+Ta) based on a loss of the inductor as the loss of the DC-to-DC converter.

4. The DC-to-DC converter of claim 1, wherein the controller is programmed to determine the interpolating points Ref (t+Ts), Ref (t+2·Ts), Ref (t+3·Ts), . . . Ref (t+n·Ts)=Ref (t+Ta) by a lookup table that relates the interpolating points with the loss of the DC-to-DC converter.

5. The DC-to-DC converter of claim 1, wherein the controller is programmed to determine the interpolating points Ref (t+Ts), Ref (t+2·Ts), Ref (t+3·Ts), . . . Ref (t+n·Ts)=Ref (t+Ta) so as to minimize a value of a performance function that relates the interpolating points with the loss of the DC-to-DC converter.

6. The DC-to-DC converter of claim 1, wherein the controller programmed to use a dead-beat control law for determining the duty.

7. A method for controlling a DC-to-DC converter including an inductor and a switching transistor connected to the inductor, the method comprising:
    acquiring a next step reference value Ref (t+Ta) for the DC-to-DC converter in a sampling time Ta, wherein the next step reference value Ref (t+Ta) is expressed by an output voltage of the DC-to-DC converter or a flux linkage of the inductor;
    determining interpolating points Ref (t+Ts), Ref (t+2·Ts), Ref (t+3·Ts), . . . Ref (t+n·Ts)=Ref (t+Ta), between a current state value that corresponds to a current reference value Ref (t) and the next step reference value Ref (t+Ta) in a sampling time Ts that is shorter than the sampling time Ta based on a loss of the DC-to-DC converter while changing from the current state value to the next step reference value Ref (t+Ta);
    determining a duty that corresponds to each of the interpolating points Ref (t+k·Ts); and supplying to the switching transistor the PWM signals with the duty that corresponds to each of the interpolating points Ref (t+k·Ts).

\* \* \* \* \*